United States Patent [19]

Leemhuis

[11] Patent Number: 4,570,493
[45] Date of Patent: Feb. 18, 1986

[54] VARIABLE ORIFICE AIR FLOW MEASURING DEVICE AND METHOD

[76] Inventor: Louis J. Leemhuis, 311 Promontory Dr. W., Newport Beach, Calif. 92660

[21] Appl. No.: 710,081

[22] Filed: Mar. 11, 1985

[51] Int. Cl.[4] .............................. G01F 1/42; G01F 1/46
[52] U.S. Cl. ................................ 73/861.62; 73/861.65
[58] Field of Search ........... 73/861.52, 861.53, 861.61, 73/861.62, 861.63, 861.64, 861.66, 861.67; 251/212

[56] References Cited

U.S. PATENT DOCUMENTS

| | | | |
|---|---|---|---|
| 1,098,247 | 5/1914 | Gibbs | 73/861.62 |
| 1,199,216 | 9/1916 | Spencer | 73/861.62 |
| 1,456,621 | 5/1929 | Chadwick | 73/861.62 |
| 1,504,507 | 8/1924 | Richardson | 251/212 |
| 2,240,119 | 4/1941 | Montgomery et al. | 73/861.63 |
| 3,724,503 | 4/1973 | Cooke | 73/861.63 |
| 3,751,982 | 8/1973 | Lambert . | |
| 3,763,884 | 10/1973 | Essig et al. . | |
| 3,765,241 | 10/1973 | Lambert . | |
| 3,895,531 | 7/1975 | Lambert . | |
| 4,147,298 | 4/1979 | Leemhuis . | |
| 4,231,253 | 11/1980 | Ohnhaus et al. | 73/861.62 |
| 4,334,648 | 6/1982 | Buth . | |
| 4,375,169 | 5/1983 | Torresin | 73/861.53 |

FOREIGN PATENT DOCUMENTS 726428  1/1980  U.S.S.R. ........................... 73/861.61

*Primary Examiner*—Herbert Goldstein
*Attorney, Agent, or Firm*—Poms, Smith, Lande & Rose

[57] ABSTRACT

A device for measuring the volume of air flowing into or out of an air conditioning duct. The device includes a hood having a top end adapted to cover the air conditioning duct to provide channeling of the air flow into an air flow measurement housing. The air flow measurement housing includes an air flow channel and a manometer for measuring the velocity pressure of air flow through the channel. Movable vanes are provided for varying the cross-sectional area of the air flow channel. Measurement of the air flow volume is accomplished by varying the cross-sectional area of the air flow channel to achieve pre-selected velocity pressure values. Scales are provided which indicate air flow volume based on calculation of the air flow volume at the particular cross-sectional area and air velocity pressure. A series of scales is provided corresponding to a series of increasing velocity pressures so that a wide range of air flow volumes may be determined.

8 Claims, 6 Drawing Figures

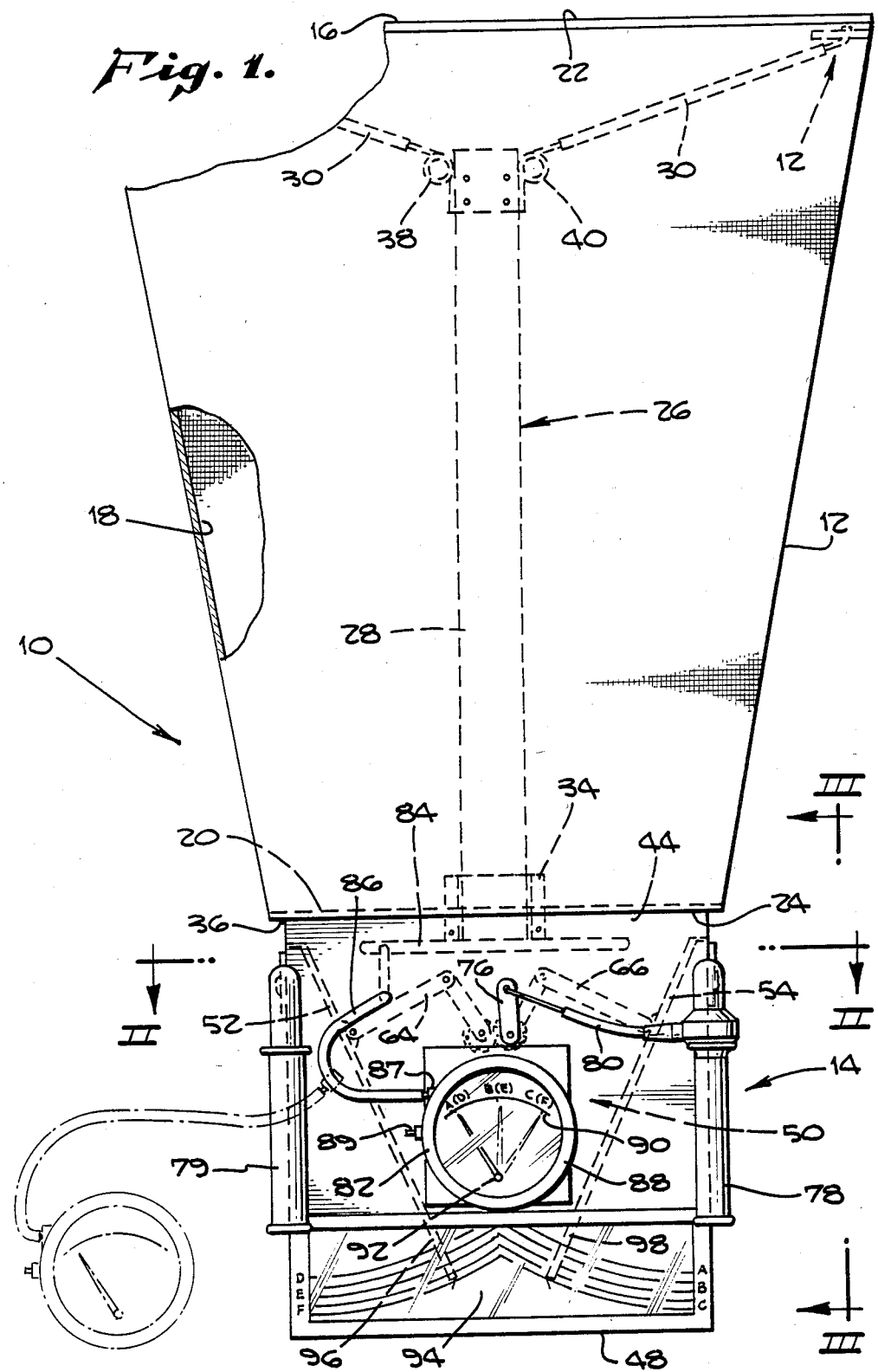

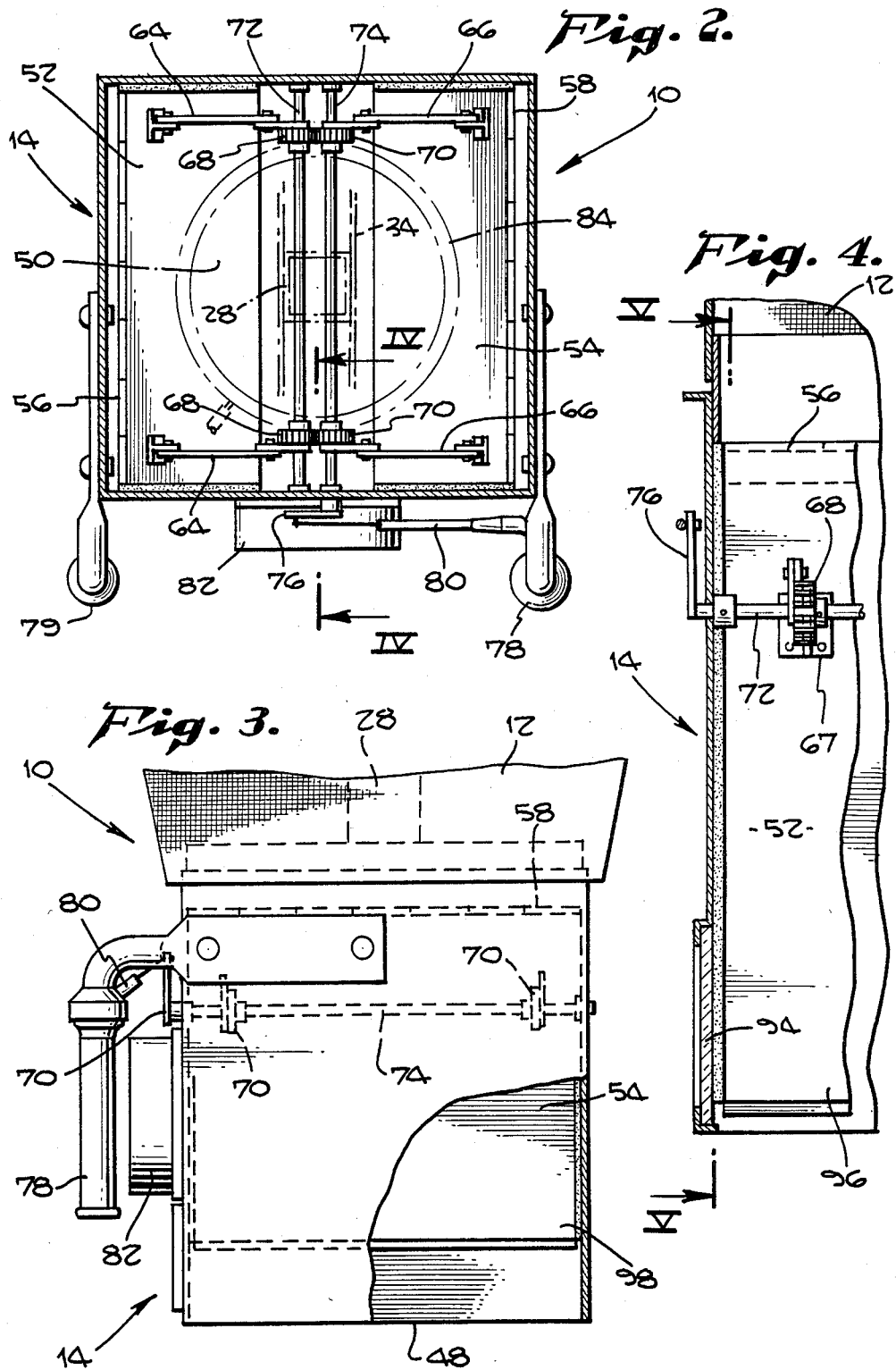

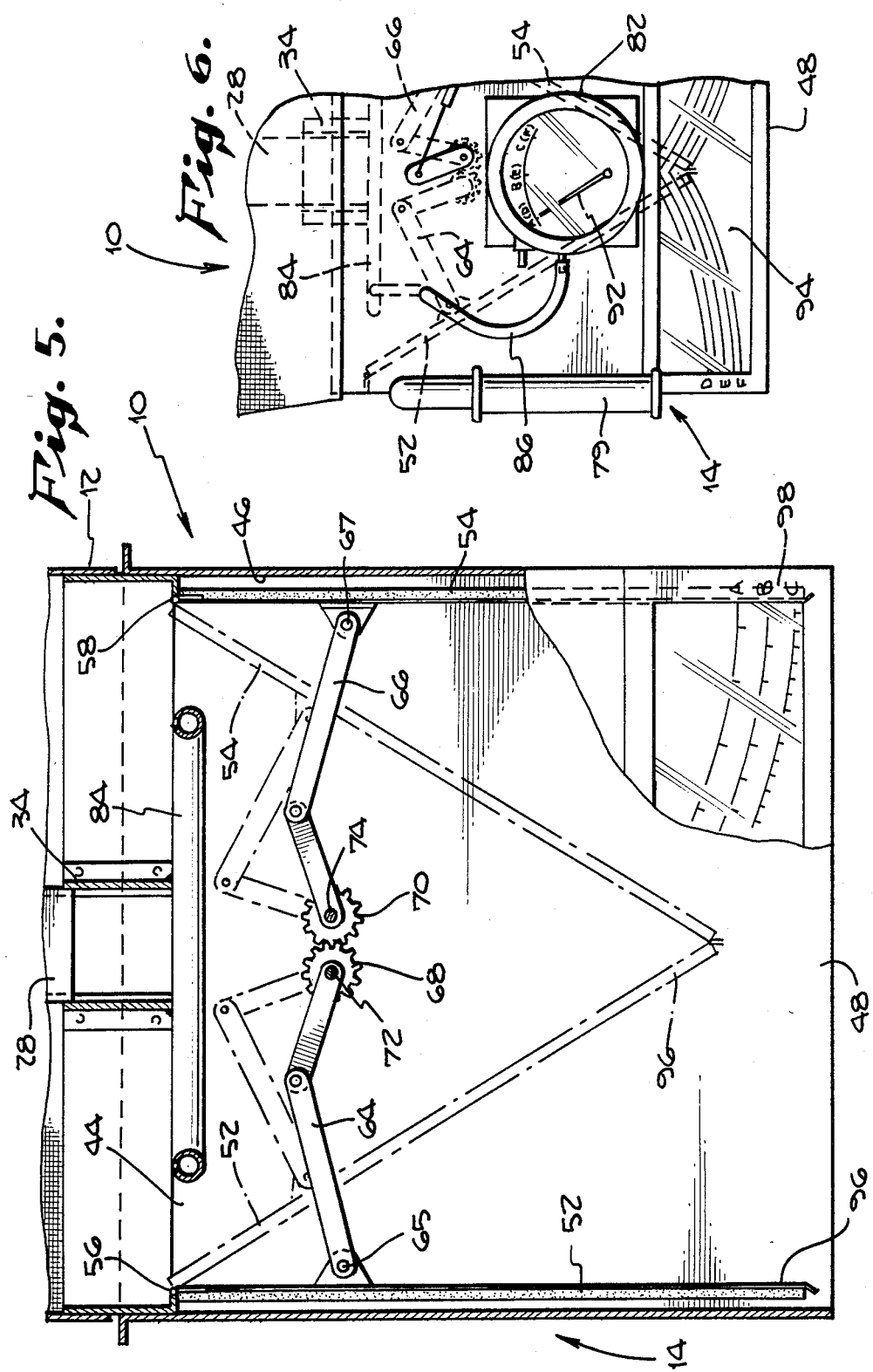

4,570,493

VARIABLE ORIFICE AIR FLOW MEASURING DEVICE AND METHOD

BACKGROUND OF THE INVENTION

The present invention relates generally to devices for measuring the volume of air flowing into or out of air conditioning systems. More specifically, the present invention relates to an improved device and method for measuring air volume flow over a wide range of flow capacities.

The use of air conditioning systems in both industrial and residential settings is widespread. An important consideration in the installation and operation of any air conditioning system whether it be a multi-story commercial building or a residential dwelling is providing the desired flow of air into the various rooms or areas within the building. It is, therefore, important that devices be provided which are capable of measuring the volume of air flowing into or out of the air conditioning ducts within the system. These devices are not only necessary during installation of the air conditioning systems to insure proper installation, but they are also necessary on a continuing basis for trouble-shooting and locating breakdowns in the air conditioning system where air flow through the ducts falls below desired levels.

Prior air flow measuring devices have been based upon the measurement of the velocity pressure of air going through a channel or duct of known cross-sectional area located within the device. The volume of air could then be calculated since the air flow in cubic feet per minute (CFM) is a function of the size of the channel through which the air is flowing and the velocity pressure (CFM = Velocity Pressure × Duct or Channel Cross-Sectional Area). In general, the prior devices include a manometer or other velocity pressure indicator which is calibrated with respect to the particular cross-sectional area of the channel or duct through the device so that air flow can be read directly from the manometer in CFM's.

Although the prior devices are well suited for measuring air flow through air conditioning ducts within certain restricted ranges. They are not well suited for measuring wide ranges of flow volumes due to the fixed cross-sectional area of the flow channel in the device. It would be desirable to provide an air flow measuring device which could be used for measuring the air flow through the air conditioning conduits or ducts of a wide range of air conditioning systems. For example, it would be desirable to have a device which could measure the relatively small air volumes typically passing through residential air conditioning systems with the same device also being capable of measuring the much greater air flow through commercial and industrial air conditioning systems.

SUMMARY OF THE INVENTION

In accordance with the present invention, a device and method is provided which can measure the flow of air through an air conditioning duct or other air flow channel over a wide range of flow rates. The present invention is based upon the use of an air flow measuring device in which the cross-sectional area of the channel in the device through which air passes for measurement is varied to achieve desired pre-selected air velocity pressures through the channel. The use of a variable cross-sectional area measuring device not only allows a wider range of air flow volumes to be measured, but also provides a more accurate air flow measurement.

The device in accordance with the present invention includes a hood having a top end which defines a first orifice adapted to cover the air conditioning duct. The hood provides channeling of the air flow from the air conditioning duct into the main measurement housing of the device. In addition to the top end, the hood also includes sidewalls and a bottom end which defines a second orifice. The air flow measurement housing has an open top end, sidewalls and an open bottom end. The air flow measurement housing includes an air flow channel through the housing. The bottom end of the hood is connected to the top end of the air flow measurement housing. The hood is designed to be easily connected and disconnected from the measurement housing so that hoods of varying size may be utilized to accommodate the wide variety of air conditioning conduit configurations and sizes.

Means for measuring the velocity pressure of air flowing through the air flow channel in the device, such as a manometer is provided. As an important feature of the present invention, means for controllably varying the cross-sectional area of the air flow channel are also provided. One or more pre-selected velocity pressure values on the manometer are calibrated with respect to the cross-sectional area of the air flow channel so that the volume of air flow may be read directly from a reading of the cross-sectional area of the air flow channel when the cross-sectional area is controllably varied to the position where the velocity pressure of air flowing through the channel is at the pre-selected level as measured by the manometer. For measuring relatively low air flow volumes, the pre-selected velocity pressure is at lower values, while the pre-selected pressure velocity level is at higher values for high capacity air conditioning systems with large air flow volumes.

The device in accordance with the present invention is substantially different from prior devices where the cross-sectional area of the device remains constant and the air volume is read from a calibrated manometer. In the present device, the cross-sectional area of the air flow channel though the device is varied until a preselected velocity pressure is achieved. The flow rate is then determined directly by reference to the cross-sectional area of the air flow channel which has been previously calibrated to read in CFM with respect to the pre-selected velocity pressure.

The above-discussed and many other features and attendant advantages of the present invention will become apparent as the invention becomes better understood by reference to the following detailed description when considered in conjunction with the accompanying drawings.

BRIEF DESCRIPTION OF THE DRAWINGS

FIG. 1 is a front view of a preferred exemplary device in accordance with the present invention.

FIG. 2 is a sectional view of FIG. 1 taken in the II—II plane.

FIG. 3 is a side view of FIG. 1 taken in the III—III plane.

FIG. 4 is a partial sectional view of FIG. 2 taken in the IV—IV plane.

FIG. 5 is a sectional view of FIG. 4 taken in the V—V plane.

FIG. 6 is a partial view of the preferred exemplary device shown in FIG. 1 except that the connection between the manometer has been changed to measure the vacuum created by air flow through the device into the air conditioning conduit as opposed to the pressure created by air flow out of the air conditioning conduit.

DETAILED DESCRIPTION OF THE INVENTION

The present invention has wide application to measuring the volume of air flow through various conduits and channels in general. The invention is especially well suited for measuring air flow rates into and out of air conditioning ducts. Accordingly, the following description will be limited to exemplary preferred devices and methods for measuring the volume of air flowing into or out of an air conditioning duct.

A preferred exemplary device in accordance with the present invention is shown generally at 10 in FIGS. 1–6. The device 10 includes a hood 12 and an air flow measurement housing shown generally at 14. The hood 12 includes an open top end 16, side walls 18 and an open bottom 20. The top end 16 defines a first orifice 22 through which air from the air conditioning duct travels to the second orifice 24 defined by the bottom 20 of the hood 12. The hood 12 is preferably made from a suitable flexible material such as parachute silk or other fabric which is relatively impermeable to air flow. Suitable synthetic fabrics or materials may also be used.

The top end 16 preferably is a rigid frame which may be pressed against the surface surrounding the duct so that an airtight seal between the hood 12 and air conditioning duct may be made. The particular shape of the top end 16 is not critical so long as the top end of the hood 16 covers the air conditioning duct so that substantially all of the air flow from the duct is channeled through the hood and into the housing 14. Preferably, a support structure such as the bar and rod configuration shown generally at 26 is provided to provide rigid support for hood 12 which, as mentioned above, is preferably made form a flexible fabric material. The support structure or bracket 26 includes a main support rod 28 (shown in phantom) and hinged support arms 30 and 32. The support rod 28 is connected to the housing 14 by way of bracket 34. The main support rod 28 may be connected to housing 14 by any suitable means so long as the rod provides a secure attachment of the hood 12 to housing 14. The bottom end 20 of the hood is designed to slip over the housing 14 as shown at 36. The support arms 30 and 32 are connected to the support rod 28 at hinges 38 and 40 with the support arms 30 and 32 being further connected to the hood as shown at 42. Again, any suitable connections may be used, so long as the hood bottom end 20 remains securely attached to housing 14 and the hood 12 is sufficiently sturdy to be pressed against the air conditioning conduit or the area around the conduit to provide an airtight seal.

The housing 14 has an open top end 44, sidewalls 46 (see FIG. 5) and an open bottom 48. The housing 14 defines an air flow channel 50 through which air from the hood 12 passes. Means for controllably varying the cross-sectional area of the air flow channel 50 is provided by vanes 52 and 54. The vanes 52 and 54 are preferably flat plates which are hinged to the housing sidewalls 46 as shown at 56 and 58 (See FIG. 5). The vanes 52 and 54 are moveable between an open position and a closed position. The open position is shown in FIG. 5 where the vanes 52 and 54 are substantially parallel to the housing sidewalls 46 so that air flow through the channel is not restricted. The vanes 52 and 54 are shown in the closed position in phantom in FIG. 5. In the closed position, the cross-sectional area of the channel is substantially zero.

Any suitable mechanical adjustment linkage or device may be used to adjust the vanes 52 and 54 between their open and closed positions. Preferably, a geared linkage arrangement as best shown in FIGS. 1, 2, 4 and 5 is preferred. The linkage arrangement includes adjustment arms 64 and 66 which are pivotally connected to vanes 52 and 54 at 65 and 67, respectively. The adjustment arms 64 and 68 are connected to gears 68 and 70, respectively, with gears 68 and 70 being mounted on rods 72 and 74. Rods 72 and 74 are mounted to the housing 14. Rotation of gears 68 and 70 provides movement of linkage arms 64 and 66 as best shown in FIG. 5 to provide the desired movement of vanes 52 and 54 between the open and closed positions. Controlled rotation of gears 68 and 70 is preferably provided by an actuating arm 76. The actuating arm 76 as best shown in FIGS. 1–4 is operated by throttle 78. Throttle 78 is a conventional motorcycle-type throttle which retracts and extends cable 80 to rotate actuating arm 76 to provide the desired movement of adjustment arms 64 and 66.

In order to make it easy to position the device against various air conditioning conduits, it is preferred that grip handle 79 be provided to allow positioning of the device with two hands.

Means for measuring the velocity pressure of air flow through the channel 50 is preferably provided by a conventional manometer shown generally at 82 and an associated pressure tube 84. The manometer 82 may be of any conventional design so long as it provides an accurate measurement of the velocity pressure at pressure tube 84. The pressure tube 84 may also be of conventional design and is preferably an annulary-shaped tube having a plurality of holes through which pressure may be measured by the manometer. The pressure tube 84 is connected as is conventionally known to the manometer by way of tubing 86. The tubing 86 is connected to the pressure intake 87 of the manometer. The manometer also includes an exhaust outlet 69. As will be described in more detail below, the tubing 86 is connected to exhaust outlet 89, as shown in FIG. 6, when air flow into the air conditioning duct is to be measured. The manometer connection as shown in FIG. 6 is designed to measure the vacuum created by suction of air into the air conditioning vent.

The manometer may be located on the outside of the housing as shown in FIG. 1. Additionally, a remote manometer may be provided as shown in phantom in FIG. 1, if desired. A remote manometer is particularly desirable in situations where it would be difficult to read a manometer attached to the outside of housing 14 due to the remote location of the air conditioning conduit.

The manometer includes a gauge 88 on which the velocity pressure through channel 50 is registered on scale 90 by needle 92. The scale is calibrated with letters A, B and C to indicate increasing values of air velocity pressure. The air velocity pressure at the various levels A, B and C are known so that the volume of air flowing through the channel 50 at different cross-sectional areas may be calculated utilizing the well-known formula for air flow volume—(CFM)=air velocity pressure (AVP)×cross-sectional area of air flow channel. The letters D, E and F in parentheses are used when the device is utilized to measure air flowing into the air conditioning duct.

The housing 14 includes a transparent portion 94 in the front wall through which the bottom ends 96 and 98 of vanes 52 and 54, respectively, may be visually observed by the technician operating device 10. This provides a visual indication of the cross-sectional area of the air flow channel. In accordance with the present invention, scales A-C are imprinted onto the transparent window 94. The scales A-C are calibrated in CFM. The transparent window scales A-C are initially calibrated by calculating the cross-sectional area of the air flow channel when the vanes are at a given position along the scale and then calculating the air flow volume for velocity pressures corresponding to the values A-C on the manometer gauge 88.

Once the CFM scales (A-C) have been calibrated, it is then possible to read the air flow rate directly from the scales by simply adjusting vanes 52 and 54 so that the manometer needle is centered on one of the values A-C on gauge 88 and then reading the CFM value from the position of vane lower portion 96 or 98 on scales A-C. For example, as shown in FIG. 1, the vanes 52 and 54 have been closed to a position where the velocity pressure is equal to A. The air flow volume is determined by reading the position of vane lower portion 98 on the calibrated CFM scale A on transparent window 94. If the air flow is sufficiently high that the needle 92 cannot be centered on the A position of the manometer gauge 88, then the vanes are moved so that the needle is centered on one of the other letters such as B or C, as represented by the needles shown in phantom in FIG. 1. When the needle is centered at position B on manometer scale 90, the CFM is then read from the position of lower vane portion 98 on scale B. Likewise, if the needle is centered on velocity pressure C on gauge 88, the air flow, in CFM, is determined by the position of lower vane portion 96 on scale C. Although the preferred exemplary embodiment is shown with three scales (A-C) being provided which correlate and correspond to three velocity pressure values A-C, it should be realized that any number of scales may be provided depending upon the number of individual velocity pressure levels selected.

It is preferred that the lower portions 96 and 98 of vanes 52 and 54 be used to indicate the cross-sectional area of the air flow channel. However, it is possible to utilize any suitable means for visually indicating the relative cross-sectional area of the air flow channel 50. It is only important that the visual indication be shown on pre-calibrated scales which are calibrated as previously mentioned by calculating the air flow in CFM based upon a known pre-selected velocity pressure and a known range of cross-sectional areas.

Many times it is desirable to determine the amount of air flowing into a air conditioning duct. In these situations, the device shown in FIG. 1 is modified to measure the negative pressure velocity or vacuum at the air conditioning duct which is created when the hood is placed over the duct. The device is modified to connect the pressure tube 86 to the manometer at exhaust outlet 89 so that the vacuum registers as a positive pressure velocity on the gauge. This modification is conventional in nature and merely involves reversing the manometer system so that vacuum is measured instead of pressure.

The scales on the left side of transparent window 94 are labeled D, E and F. These scales correspond to the negative pressure levels (D), (E) and (F) indicated on the manometer. The scales D, E and F are calibrated with respect to the D, E and F negative pressure levels on the manometer in the same manner as the calibration of the A-C scales as previously described. The scales are also calibrated to read CFM directly by the position of the lower vane portion 96 along scales D, E or F when the needle 92 on the manometer measures a negative pressure level D, E or F, respectively. The operation of device 14 for measuring air flow into the duct is basically the same as for measuring air flow out of the duct except that the connection of tube 86 to the manometer is changed so that the negative pressure is indicated on the manometer gauge and the CFM flow is read from scales D-F instead of A-C. Otherwise, the same basic principles regarding the relationship between air volume flow and velocity pressure and cross-sectional area of the air flow channel apply.

Having thus described exemplary embodiments of the present invention, it should be noted by those skilled in the art that the within disclosures are exemplary only and that various other alternatives, adaptations and modifications may be made within the scope of the present invention.

Accordingly, the present invention is not limited to the specific embodiments as illustrated herein, but is only limited by the following claims.

What is claimed is:

1. A device adapted for use in measuring the volume of air flowing into or out of an air conditioning duct comprising:

a hood having a top end which defines a first orifice adapted to cover said air conditioning duct to provide channeling of said air flow from said air conditioning duct into said device, said hood further including side walls and a bottom end which defines a second orifice;

an air flow measurement housing having an open top end, side walls and an open bottom end, said air flow measurement housing defining an air flow channel having a cross-sectional area;

means for connecting the bottom end of the hood to the top end of the air flow measurement housing;

means for controllably varying the cross-sectional area of said air flow channel comprising first and second vanes located within said air flow channel, said vanes being moveable between an open position where said vanes are substantially parallel to the housing side walls so that air flow through said channel is not restricted and a closed position where the vanes are positioned to restrict the cross-sectional area of said air flow channel to substantially zero and wherein said first vane includes a top end hingedly mounted to said housing side wall and a second end, said second end being located adjacent said housing side wall at said open position and displaced centrally within said air flow channel at said closed position and said second vane includes a top end hingedly mounted on said housing wall on the opposite side of said air flow channel from said first vane, said second vane having a bottom end which is located adjacent said housing wall at said open position and displaced centrally within said air flow channel at said closed position;

means for measuring the velocity pressure of air flow through said air flow channel; and calibration means for correlating the cross-sectional area of said air flow channel with the velocity pressure of air flow through said channel to provide a measurement of the volume of air flowing through said air flow channel which thereby provides a measurement of the volume of air flowing into or out of said air conditioning duct.

2. A device according to claim 1 wherein said means for controlling the positioning of said vanes includes:

common linkage means between said first and second vanes for providing common movement of said vanes between said open and closed positions; and throttle means mounted externally on said housing for actuating said common linkage means.

3. A device according to claim 1 wherein said means for measuring the velocity pressure of air flow through said air flow channel includes:

a pressure tube located in said channel for measuring the air pressure in said channel; and manometer means in air pressure communication with said pressure tube for providing a visual indication of the air velocity pressure at said pressure tube.

4. A device according to claim 1 wherein said calibration means includes:

means for providing a visual indication of the cross-sectional area of said air flow channel, said visual indication including calibrated indicia of the volume of air flowing through said air flow channel, said calibrated indica in combination with said means for measuring the air flow velocity pressure providing a measurement of the volume of air flowing through said air conditioning duct.

5. A device according to claim 4 wherein said calibrated indica includes at least two parallel scales, each of said scales being calibrated to correspond to a preselected air flow velocity pressure as indicated on said means for measuring the velocity of air flow through said air flow channel, said parallel calibrated scales, in combination with the corresponding air flow velocity pressure, providing measurement of air flow volume over a wider range than possible with only a single calibrated scale corresponding to a single air velocity pressure 6. A device according to claim 4 wherein said visual indication means includes means for visually depicting the position of the bottom end of said first or second vane on said calibrated scales.

7. A device according to claim 1 wherein said air flow measurement housing includes a front wall, side walls and a back wall, said vanes being attached to the side walls, said housing further including a transparent portion in said front wall to provide visual inspection of the bottom ends of the first and second vanes as they are moved between said open and closed positions, said transparent portion including said calibrated scales to provide a direct reading of the position of said vanes on said scales.

8. A device according to claim 7 wherein first, second and third parallel calibrated scales are provided on said transparent portion, said first, second and third calibrated scales which correspond to first, second and third air velocity pressures indicated on said means for measuring the velocity of air through said air flow channel, wherein air flow volume is determined by moving said vanes to a position where said air velocity pressure it at said first, second or third air velocity pressure and then visually determining the position of said vanes on said scales and reading the air flow volume from the first, second or third calibrated scale, depending upon whether said air velocity pressure is at said first, second or third air velocity pressure, respectively.

* * * * *